T. G. RENNERFELT.
BALL BEARING.
APPLICATION FILED SEPT. 28, 1915.
1,269,117.
Patented June 11, 1918.
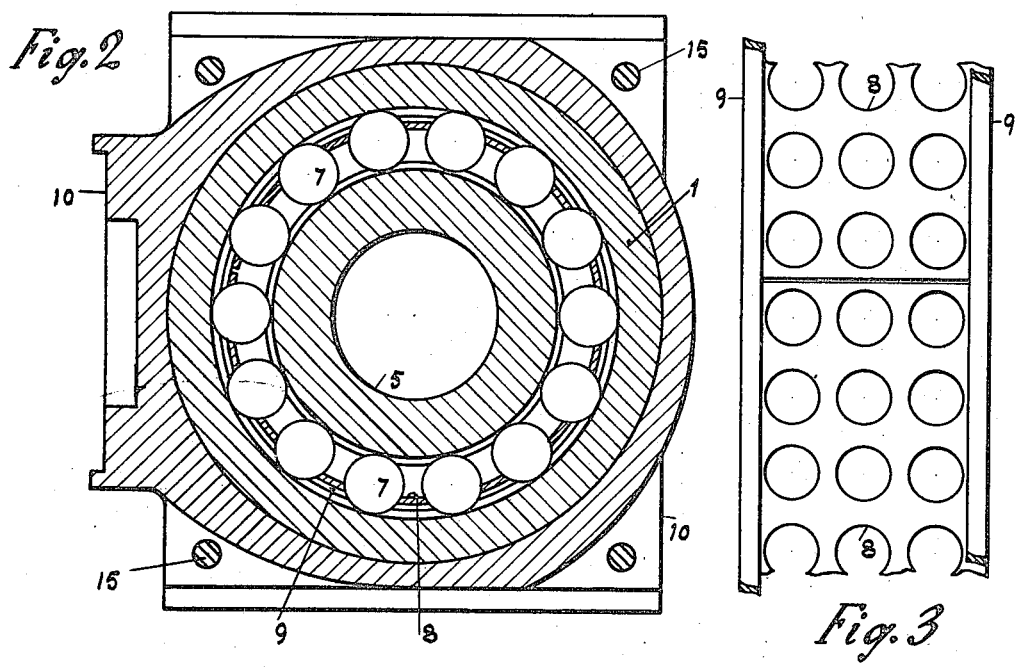
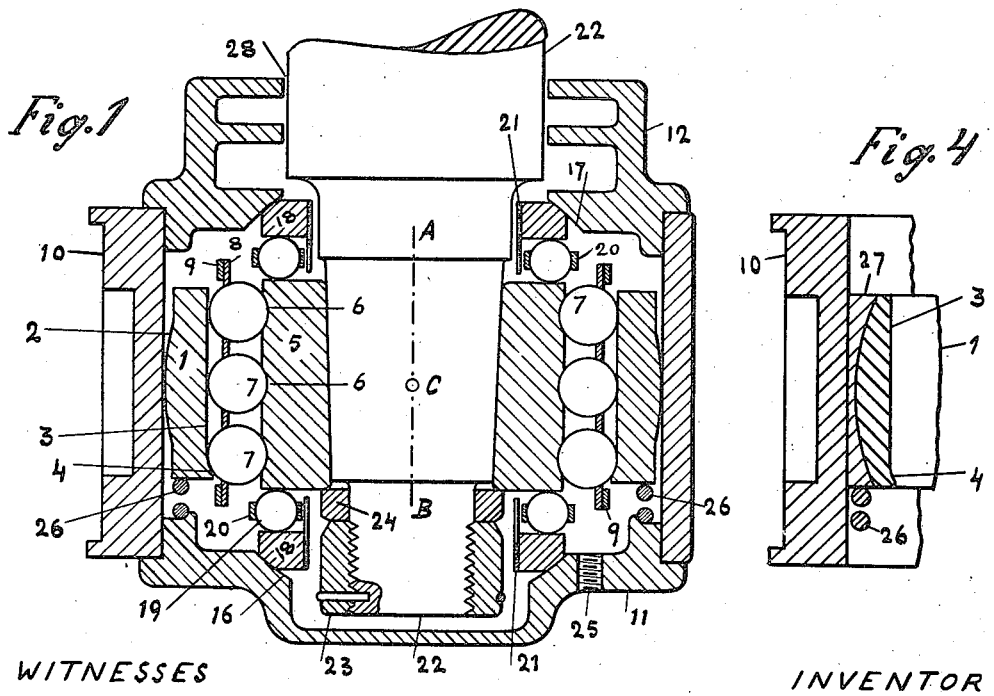
WITNESSES
INVENTOR
Ture Gustaf Rennerfelt

UNITED STATES PATENT OFFICE.

TURE GUSTAF RENNERFELT, OF KATRINEHOLM, SWEDEN.

BALL-BEARING.

1,269,117.

Specification of Letters Patent. Patented June 11, 1918.

Application filed September 28, 1915. Serial No. 53,101.

*To all whom it may concern:*

Be it known that I, TURE GUSTAF RENNERFELT, a subject of the King of Sweden, and a resident of Katrineholm, in the county of Stora Malm, Sweden, have invented certain new and useful Improvements in Ball-Bearings, of which the following is a specification.

This invention relates to improvements in ball bearings, and its object is to produce such a bearing in which a geometrically correct rolling motion of the balls upon the races shall always take place under any and all working conditions. It is well known to those versed in the art that this is not the case with the ordinary types of ball bearings, in which an appreciable amount of slip accompanied by sliding friction will take place especially when the journal, provided with the bearing, can bend or spring, or when ball bearings are arranged for sustaining from one journal pressure in both axial and radial directions, and generally when the working conditions are such that any deviation may occur in the normal relative position of the journal and the casing which incloses the race-rings and the balls. Experience has proved that this slip and sliding friction constitutes a great difficulty and inconvenience in ball bearings inasmuch as it causes heating and wear of the bearings and frequently their rapid destruction—the more so when they are used for great loads and high speeds.

My invention is designed to overcome this difficulty. In my improved bearing all the balls, whether they sustain pressure in lateral or in axial direction, will roll in exact circles located in planes at right angle to the center line of the inner ring, the pressure on the balls which sustain lateral load is directed at right angle to said center line, the pressure on the thrust sustaining balls is directed parallel with the same line, the casing which incloses the race rings is capable of a swiveling, gyratory or universal movement around all the race rings, so that a deviation is permitted in any direction between the journal and the said casing, and the construction of the bearing is such that the relative position of all the race rings depends on no other parts than such which are made of hardened steel, ground to exact dimensions, so that no parts which are finished merely by turning or which are made of other material than hardened steel are interposed between any of the race rings.

This latter requirement is for the reason that the race rings must be made with an accuracy which can be had only by the process of grinding and polishing, and they must also be assembled into an exact and unvariable position in relation to each other which could not be obtained if it depended on some part with a finish inferior to, or less accurate than the finish obtained on hardened steel by the process of grinding.

My invention is illustrated in the accompanying drawing in which Figure 1 shows in longitudinal section such a bearing arranged to sustain load in lateral and in either axial direction and thus suitable for instance to the journal of a street car. Fig. 2 shows a transverse section of the same bearing, and Fig. 3 shows a part of a detail called the ball retainer. Fig. 4 shows a modification.

In the drawing 1 denotes the outer ring constructed integrally in one piece, formed on its outside at 2 as a part of a sphere and provided on its inside with a continuous unbroken cylindrical running face 3, which at one end (the lower end in Fig. 1) is contracted to a concave face 4. The inner ring, denoted by 5, has flat ends and is provided with three concave grooves or running faces 6, in which the balls 7 are arranged to roll between the two rings. The number of grooves and the size of the balls are chosen with regard to the magnitude of the pressure acting in lateral direction on the bearing. The profile of the groove is an arc of a circle with radius somewhat greater than the radius of the ball. The retainer for the balls 7 consists of a plate 8 perforated by holes somewhat smaller than the balls as shown in Fig. 3 and bent to cylindrical form as shown in Figs. 1 and 2, so as to surround the inner ring and rest on the balls. After the plate 8 is thus placed in its position a ring 9 is slipped over each end of the bent plate and secured so that the cylindrical shape of the ball retainer will not become altered.

The casing which incloses the outer ring is shown as constructed in three pieces, a middle part 10 formed with a cylindrical bore, in which the outer ring is free to slide, a cap 11, and a cover 12 shaped so, as to serve as a dust protector, said parts 10, 11 and 12 being securely bolted together as by bolts 15. The inner faces of the parts 11 and 12 are formed as spherical seats or concavities 16, 17 having a common center C located on the center line A—B of the aforesaid cylindrical bore. 18, 18 denote hardened steel disks of which one side is ground spherical so as to fit in the spherical seat. The opposite side of the disk 18 is flat or plane—being ground and polished. A series of balls 19, arranged to sustain the thrust on the bearing, is interposed in contact between the flat side of each disk and the flat ends of the inner ring. 20, 20 denote ball retainers for the balls 19. To each disk 18 is fastened a hollow cylinder 21, preferably split so that it is somewhat springy, which extends into the ball retainer 20, and serves the purpose of limiting its deviation from the center line of the inner ring.

The journal or shaft upon which the bearing is mounted, is shown tapered and denoted by 22. The inner ring is securely fastened to the journal by means of a nut 23 and washer 24. An oil hole is indicated at 25. A spiral spring—or several springs—26 is applied between the cap 11 and that end of the outer ring at which the concave face 4 is formed. This spring—or springs—serves the purpose of helping the frictional forces between the outer ring and the casing to retain the said ring in such position that the center of its outside spherical surface shall coincide with the point C. The spring, however, does not prevent a slight gyratory or universal movement of the casing in any direction around the point C relatively to the rings and the disks. The outer ring is placed in its correct position relatively to the inner ring by slipping it over the inner ring and its balls and ball retainer so far as permitted by the contact of the balls 7 against the concave face 4. Since the outer ring is free to slide in the cylindrical bore of the casing, it is evident that said ring will offer no resistance to any end thrust acting on the bearing. Since the ring 5 is constructed integrally in one piece of hardened steel, it is possible to grind it after such a method that all the grooves 6 shall have a common axis—the axis of rotation of the inner ring—and further with such accuracy that the pressure acting laterally on the bearing will be nearly uniformly distributed on all the rows of balls, especially when the balls are of such fairly large size as suitable for the journal of a street car. Also by the same method the two ends of the inner ring are ground so that they constitute planes at right angle to said center line. When pressure is brought upon the disks 18 from the balls 19, they will become automatically adjusted upon the spherical seats 16, 17, so that their flat faces will be parallel with the ends of the inner ring. The distance between a ball 19 and the axis of rotation of the inner ring is neither constant nor uniform, for when one of the two series of balls 19 is loaded, the other one will be unloaded so that nothing but the spring 21 will limit their deviation relatively to the said line. But since the balls 19 are placed between two surfaces which constitute planes at right angle to the axis of rotation, the rolling motion of the balls will be geometrically correct and their load will be uniformly distributed in spite of some variation in the said distance. Experience has proved that the increase in the load carrying ability of a ball, which is obtained when the ball rolls in concave grooves, is not sufficient to counterbalance the evil effects caused by the sliding of the ball which such grooves will cause under certain conditions. For this reason I prefer to let the balls 19 roll between plane surfaces rather than in grooves. I also prefer to let the balls 7 roll upon the cylindrical inner face of the outer ring rather than in grooves, partly for the reason that this construction makes it easier to assemble the bearing, but mainly for the reason, that no mechanical means are yet known for producing such grooves with the required accuracy. It is evident from the drawing that the balls 7 will roll in planes at right angle to the axis of rotation of the inner ring, and also that the pressures acting on them from the rings as well as the centrifugal force are directed along such planes.

According to the modification shown in Fig. 4 the outer ring is not mounted directly in the casing, but placed so that it can swivel within a sleeve 27, spherical on its inside and cylindrical on its outside, and slidably mounted in the casing. The spring 26 is in this case applied between the cap 11 and the sleeve 27.

The casing is made of cast iron or cast steel, the balls of hardened steel ground and polished, and the rings and disks are also made from hardened steel with their running faces ground and polished.

By the construction described, a bearing is obtained, which is free from the above mentioned difficulties and which will permit without inconvenience or damage a deviation between the line A—B and the center line of the shaft to the extent limited by the clearance indicated at 28, which deviation may be caused, for instance, by the bending of the shaft under a load.

Having thus fully described my invention, what I claim is:

1. The combination of an inner ring having a plurality of concave grooves, an outer ring spherical on its outside and formed on its inside with a cylindrical running face at one end and with a concave face at its other end, a row of balls in each groove between the rings, and a casing having a cylindrical bore inclosing the outer ring, together with means, independent of the outer ring, for sustaining end pressure on the inner ring.

2. The combination of an inner ring having a plurality of concave grooves, an outer ring spherical on its outside and formed on its inside with a cylindrical running face at one end and with a concave face at its other end, a row of balls in each groove between the rings, a perforated plate bent to a cylinder around the inner ring and resting on the balls, a ring mounted on each end of the cylinder and a casing having a cylindrical bore inclosing the outer ring.

3. The combination of an inner ring having a plurality of concave grooves, an outer ring spherical on its outside and formed on its inside with a cylindrical running face at one end and with a concave face at its other end, a row of balls in each groove between the rings, a casing having a cylindrical bore inclosing the outer ring, and a spring between the casing and the latter end of the outer ring, together with means within the casing, independent of the outer ring, for sustaining end pressure acting on the inner ring.

4. The combination of an inner ring formed with a plurality of concave grooves, an outer ring having an outside spherical surface and formed on its inside with a cylindrical running face, a row of balls in each groove between the rings, a disk opposite to each end of the inner ring, a series of balls in contact with each disk and with an end of the inner ring, and a casing arranged to be capable of a gyratory movement around the rings and the disks.

5. The combination of an inner ring formed with flat ends and with a plurality of concave grooves, an outer ring formed on its inside with a cylindrical running face at one end and with a concave face at its other end, a row of balls in each groove between the rings, a disk having a flat face opposite to each end of the inner ring, a series of balls in contact with a disk and with the flat end of the inner ring, a ball retainer for each series of balls, and yielding means within the ball retainer for limiting its deviation from the center line of the inner ring.

6. The combination of an inner ring formed with flat ends and with a plurality of concave grooves, an outer ring formed on its inside with a cylindrical running face at one end and with a concave face at its other end, a row of balls in each groove between the rings, a disk having a flat face opposite to each end of the inner ring, a series of balls in contact with a disk and with the flat end of the inner ring, and means fastened to the disk for limiting the deviation of the series of balls from the center line of the inner ring.

7. The combination of an inner ring formed with flat ends and with a plurality of concave grooves, an outer ring having an outside spherical surface and formed on its inside with a cylindrical running face at one end and with a concave face at its other end, a row of balls in each groove between the rings, a casing having a cylindrical bore and two concentric spherical seats, a disk mounted in each spherical seat and having a flat face, a series of balls in contact with each disk and with an end of the inner ring, and yielding means for retaining the outer ring so that the center of its spherical surface coincides with the center of the spherical seats.

8. The combination of an inner ring having a plurality of concave grooves, an outer ring spherical on its outside and formed on its inside with a cylindrical running face, a row of balls in each groove between the rings, a casing having a cylindrical bore inclosing the outer ring, and means within the casing independent of the outer ring for retaining the inner ring in its position relatively to the outer ring.

9. The combination of an inner ring formed with flat ends and with a plurality of concave grooves, an outer ring having an outside spherical surface and formed on its inside with a cylindrical running face, a row of balls in each groove between the rings, a casing having a cylindrical bore and two concentric spherical seats, a disk mounted in each spherical seat, a series of balls in contact with each disk and with an end of the inner ring, and means for retaining the outer ring so that the center of its spherical surface coincides with the center of the spherical seats.

Signed at Stockholm in the county of Stockholm, Sweden this 8th day of Sept. A. D. 1915.

TURE GUSTAF RENNERFELT.

Witnesses:
GRETA PRIEN,
FRANK LYON.